US007058387B2

(12) United States Patent
Kumar et al.

(10) Patent No.: US 7,058,387 B2
(45) Date of Patent: Jun. 6, 2006

(54) SYSTEM AND METHOD FOR PROVIDING COST OF QUALITY OF SERVICE LEVELS IN A WIRELESS COMMUNICATION DEVICE

(75) Inventors: Anil K. Kumar, Chandler, AZ (US); Matthew A. Hayduk, Calgary (CA)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 10/000,051

(22) Filed: Nov. 1, 2001

(65) Prior Publication Data

US 2003/0083041 A1 May 1, 2003

(51) Int. Cl.
*H04M 11/00* (2006.01)
*H04M 11/10* (2006.01)
*H04M 15/00* (2006.01)

(52) U.S. Cl. .................. 455/406; 455/407; 455/414.3; 379/114.06; 379/201.04; 370/352

(58) Field of Classification Search ................ 455/405, 455/406, 407, 408, 409, 414.3; 379/114.02, 379/114.03, 115.01, 114.19, 114.2, 114.06, 379/201.04; 370/352
See application file for complete search history.

(56) References Cited

U.S. PATENT DOCUMENTS

| 5,606,602 | A | * | 2/1997 | Johnson et al. ........ 379/114.02 |
| 5,764,645 | A | | 6/1998 | Bernet et al. ................ 370/466 |
| 5,796,727 | A | | 8/1998 | Harrison et al. ............ 370/338 |
| 5,802,502 | A | * | 9/1998 | Gell et al. ...................... 705/37 |
| 5,982,748 | A | * | 11/1999 | Yin et al. .................... 370/232 |
| 6,047,326 | A | | 4/2000 | Kilkki ........................ 709/228 |
| 6,181,711 | B1 | | 1/2001 | Zhang et al. ................ 370/468 |
| 6,185,413 | B1 | * | 2/2001 | Mueller et al. ............. 455/405 |
| 6,201,966 | B1 | | 3/2001 | Rinne et al. ................ 455/434 |
| 6,418,196 | B1 | * | 7/2002 | Brlenic et al. ........... 379/32.04 |
| 6,463,274 | B1 | * | 10/2002 | Robertson .................... 455/406 |
| H2051 | H | * | 11/2002 | Zhu et al. .............. 370/395.21 |
| 6,493,556 | B1 | * | 12/2002 | Stinson ...................... 455/445 |
| 6,556,817 | B1 | * | 4/2003 | Souissi et al. .............. 455/406 |

(Continued)

OTHER PUBLICATIONS

"3rd Generation Partnership Project; Technical Specification Group Services and System Aspects; Description of Charge Advice Information (CAI)", 3G TS 22.024 V3.0.1, pp. 1-14, (1999).

(Continued)

*Primary Examiner*—Binh K. Tieu
(74) *Attorney, Agent, or Firm*—Schwegman, Lundberg, Woessner & Kluth, P.A.

(57) ABSTRACT

A method of initiating a wireless communication session with a communication network is provided. A cost estimate for the communication session is determined based on a quality of service level and a quantity of information to be communicated. The communication session is initiated when the cost estimate is accepted. In one embodiment, the user may select a second quality of service level for the communication session when the first cost estimate is not accepted and is provided a second cost estimate for the second quality of service level. In yet another embodiment, a communication session is initiated when there is sufficient balance available to the wireless communication device or a user's smart card for a communication session at a quality of service level selected by the user. In one embodiment, the method may be performed in accordance with a packet radio service network providing packet data services.

32 Claims, 4 Drawing Sheets

U.S. PATENT DOCUMENTS

| | | | |
|---|---|---|---|
| 6,647,265 B1* | 11/2003 | Olofsson et al. | 455/445 |
| 6,690,929 B1* | 2/2004 | Yeh | 455/406 |
| 6,721,554 B1* | 4/2004 | Gnesda et al. | 455/406 |
| 6,775,267 B1* | 8/2004 | Kung et al. | 370/352 |
| 6,801,777 B1* | 10/2004 | Rusch | 455/452.2 |
| 6,925,057 B1* | 8/2005 | Cheng et al. | 370/235 |
| 6,934,530 B1* | 8/2005 | Engelhart | 455/406 |
| 2002/0022471 A1* | 2/2002 | Watler et al. | 455/405 |
| 2002/0077107 A1* | 6/2002 | Eng et al. | 455/445 |
| 2002/0132611 A1* | 9/2002 | Immonen et al. | 455/414 |
| 2002/0155823 A1* | 10/2002 | Preston et al. | 455/406 |
| 2003/0003894 A1* | 1/2003 | Kumar | 455/406 |
| 2003/0027554 A1* | 2/2003 | Haumont | 455/414 |

OTHER PUBLICATIONS

"3rd Generation Partnership Project; Technical Specification Group Services and System Aspects; Service Aspects; Service Principles", 3G TS 22.101 3.10.0, pp. 1-33, (2000).

"3rd Generation Partnership Project; Technical Specification Group Services and System Aspects; Service Aspects; Charging and Billing", 3G TS 22.115 3.3.0, pp. 1-14, (2000).

"3rd Generation Partnership Project; Technical Specification Group Services and System Aspects; Service Aspects; Charging and Billing", 3GPP TS 22.115 5.1.0, pp. 1-14, (2001).

* cited by examiner

SYSTEM AND METHOD FOR PROVIDING COST OF QUALITY OF SERVICE LEVELS IN A WIRELESS COMMUNICATION DEVICE

BACKGROUND OF THE INVENTION

Wireless communications provides users the ability to communicate many types of information using a wide variety of communication techniques ranging from analog communication techniques to wideband CDMA techniques to wireless local area network techniques. Generally, users of wireless communication devices are charged for communication services based on connection time regardless of the amount of information that is communicated or the quality of service provided. For example, a user of a wireless device such as a wireless phone or wireless data terminal is generally charged on a per minute basis whether a voice conversation takes place or whether data is communicated. These per minute charges are also generally independent of the amount of information communicated. As a result, users tend to limit their connection time to reduce charges for the communication session. With advent of wireless networks that support packet data services, the length of a communication session may be difficult to estimate and communication sessions may extend for very long periods of time (e.g., days, weeks, or even longer) depending on the amount of information communicated, packet priority, quality levels, or bandwidth allocated. In addition, the cost of such services may also depend on factors such as the network service provider (e.g., the carrier), roaming charges, use of a private network, number of hops, or security level.

As can be seen, it is extremely difficult for a user of a wireless communication device, and especially for a user operating in a wireless packet data system, to estimate the cost of a communication session and make an informed decision regarding the various options for communicating. For example, a user may wish to send a wireless fax but cannot easily determine whether a non-real-time communication technique using a service which may charge on a per packet basis is more cost effective than sending a wireless fax by a real-time communication technique using a service that charges on a per minute basis. These services may have different quality of several levels making it all the more difficult for users to make an informed choice. Systems that support the Universal Mobile Telephone System (UMTS) standard, for example, may provide communication sessions at several service levels which can correspond with different costs. Although different service levels may be available, a user, however, has no easy way of determining a cost of a communication session prior to initiating the session, and therefore has no way of making an informed decision prior to initiating the communication session.

Current techniques referred to as "advice of charge" provide a user with the accumulated cost of an ongoing communication session. These "advice of charge" techniques are not helpful to users who wish to know the cost of a communication session beforehand, and may wish to choose between alternate communication options that are available.

Thus, there is a need for a method and wireless communication device that beforehand, provides users with the estimated cost of a communication session. There is also a need for a method and wireless communication device that allows a user of a wireless communication device to choose a level of quality for a communication session based on a cost estimate for the communication session. There is also a need for a method and wireless communication device that allows a user to select a lower level of quality for a communication session when a cost estimate for the communication session is too high. There is also a need for a method and wireless communication device that provides a cost estimate for a communication session based on a quality of service level for the communication session. There is also a need for a method and wireless communication device that estimates a content quantity prior to a communication session to provide a user with a cost estimate for the communication session based on the estimated quantity of the information and a desired quality of service level. There is also a need for a method and wireless communication device that allows a user to select between various quality of service levels for a communication session. There is also a need for a method and wireless communication device that allows a user to select between various quality of service levels across various communication networks.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

The present invention relates to wireless communication devices and communicating within wireless communication networks. In one embodiment, the present invention provides a method of initiating a wireless communication session with a communication network. In accordance with this embodiment, a cost estimate for the communication session is determined based on a quality of service level and a quantity of information to be communicated. The communication session is initiated when the cost estimate is accepted. Accordingly, a user may make informed decisions based on an estimated cost and quality of a wireless communication session prior to initiation.

In one embodiment, the present invention relates to a packet radio service network that provides packet data services. In this embodiment, a cost estimate of a communication session is determined based on a quality of service level and a quantity of information to be communicated. The cost estimate is provided to a user of a wireless communication device and the communication session is initiated when the cost estimate is accepted. In another embodiment, the user may select a second quality of service level for the communication session when the cost estimate is not acceptable. In this embodiment, the user may be provided a second cost estimate for a communication session at the second quality of service level. In yet another embodiment, a communication session is initiated when there is sufficient user credit available to the wireless communication device or within a user's smart card for a communication session at a quality of service level selected by the user. In yet another embodiment, a user is provided cost and quality of service information for available communication service options allowing the user to select a communication service option that provides a cost-efficient communication session at an acceptable quality of service level.

In one embodiment, the present invention applies to a packet radio service network that provides packet data services to wireless communication devices in accordance with a packet data protocol (PDP). In accordance with this embodiment, a wireless communication device is assigned one or more PDP addresses for communicating during a plurality of communication sessions. The packet radio service network may provide communications at a first quality of service level during a first of the communication sessions, and may provide communications at a second quality of service level during a second of the communication sessions. In this embodiment, a first content type may be communicated during the first session at the first quality of service level, and a second content type may be communicated during the second session at the second quality of service level. In this embodiment, the first quality of service level may have a first cost of service associated therewith, and the second quality of service level may have a second cost of service associated therewith. A cost estimate is provided to a user to communicate a first content type based on the first cost of use and a quantity of information to be communicated, and an input may be received from the user to either reject or accept the cost estimate. In an alternate embodiment, first and second PDP addresses may be used for providing, respectively, first and second quality of service level communication to a wireless communication device.

Figure 1:
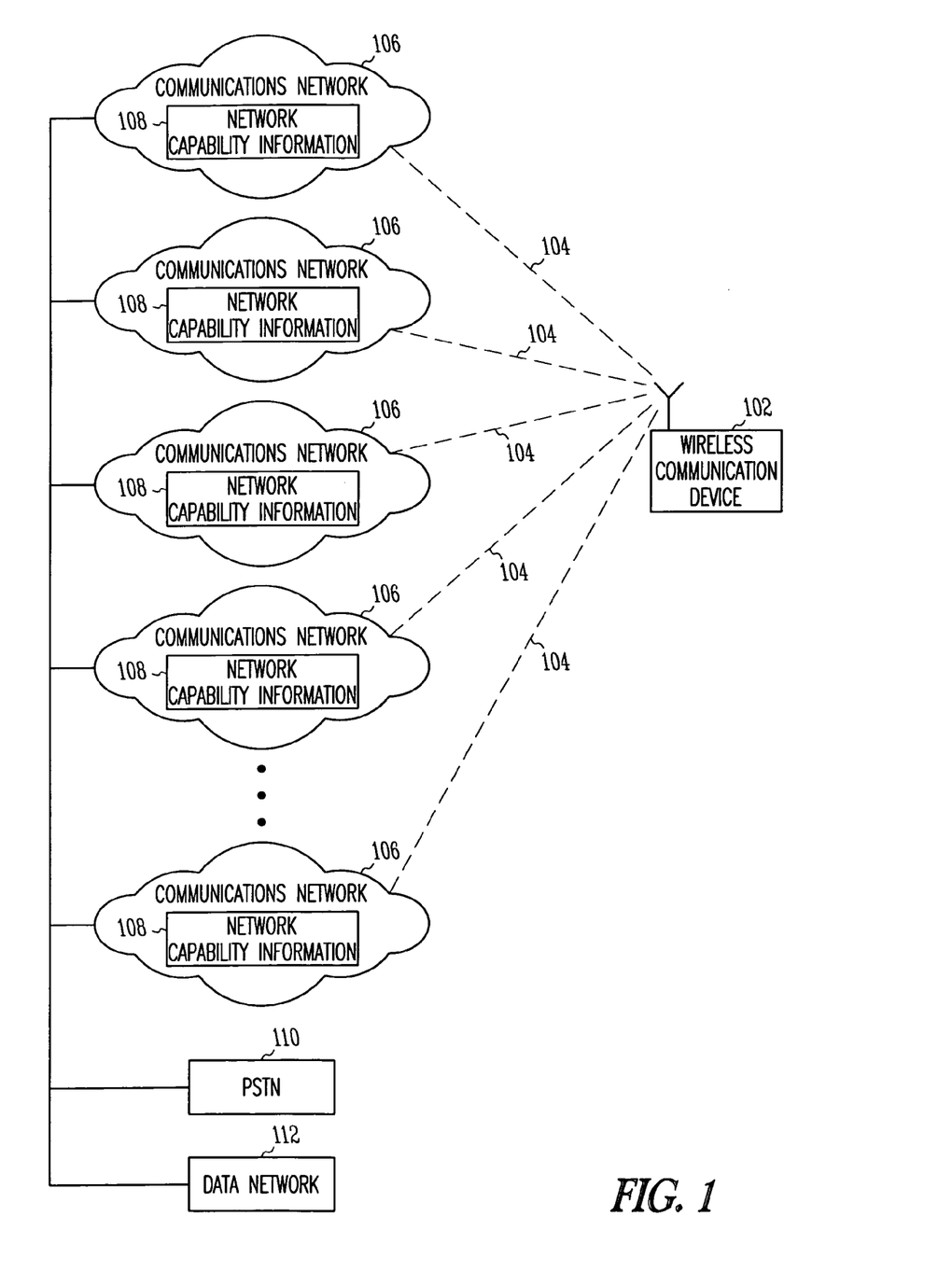
FIG. 1 illustrates a functional block diagram of a wireless communication device in communication with a plurality of communication networks in accordance with an embodiment of the present invention.

FIG. 1 illustrates a functional block diagram of a wireless communication device in communication with a plurality of communication networks in accordance with an embodiment of the present invention. Wireless communication device 102 is a communication device which may communicate over wireless links 104 with one or more communication networks 106. Wireless communication device 102 may be any form of wireless, mobile or remotely located data device or system including a mobile data terminal, a wireless or cellular telecommunication device, or a portable computer with wireless communication functionality. Wireless communication device 102 may communicate or access any of the other communication networks 106, communication systems such as, for example, the public switched telephone network (PSTN) 110, or data networks 112 through one of communication networks 106. Wireless communication device 102 may include functionality for communicating various information content types over wireless links 104 and implementing at least one of many communication techniques with one or more communication networks 106. Wireless communication device 102 may also include functionality to operate as a personal digital assistant (PDA), a Web tablet, or any device that provides access through one of communication networks 106 to one of data networks 112 such as, for example, an intranet, the internet, or other data network.

Communication techniques that wireless communication device may implement include both digital and analog wireless communication techniques including code division multiple access (CDMA) techniques, wideband CDMA (WCDMA) techniques, or frequency division multiple access (FDMA) techniques, time-division multiple access (TDMA) techniques.

Wireless communication device 102 may also be able to communicate in accordance with various communication standards and protocols with one of the communication networks 106 including, for example, a wireless application protocol (WAP), or i-Mode protocol. Other examples of communication methods that wireless communication device 102 may generally support include the many digital mobile communication standards, such as, for example, the Pan-European mobile system standard referred to as the Global System for Mobile Communications (GSM), and techniques in accordance with packet radio services such as the General Packet Radio Service (GPRS) packet data communication service. In one embodiment of the present invention, one or more of networks 106 may provide for communications in accordance with the Universal Mobile Telephone System (UMTS) for the next generation of GSM which may, for example, implement the International Mobile Telecommunications for the year 2000 (IMT-2000) family of third-generation (3G) wireless standards. In this embodiment, one or more of communication networks 106 may provide packet data services (PDS) utilizing packet data protocols (PDP).

Each communication network 106 may include base stations (not shown) for supporting communication links 104 as well as other supporting elements for facilitating communications with wireless communication devices. For example, a GSM-type network may include one or more support nodes that provide an interface between a packet radio type of system and other communication systems and networks. The support node provides wireless communication devices with a communication service such as a packet data service through one of the several base stations. Support nodes may include "Servicing GPRS Support Nodes" (SGSN).

Communication networks 106 comprise network capability information 108 which define the techniques an associated communication network may use for communication with wireless communication devices, as well as defining the services offered to wireless communication devices. For example, network capability information 108 may define whether an associated communication network 106 is a GSM type network that offers packet radio communications, an ATM type network, or an analog cellular network. Network capability information 108 may also define various data and voice communication services that are provided by the associated one of communication networks 106. For example, a communication network may offer communication services at various data rates, various priority levels, and various error rates and/or quality of service levels. Network capability information 108 may also include cost information for the communication services offered as well as the various aspects of the services and quality of service levels.

In one embodiment, communication networks 106 may provide associated network capability information 108 in real-time to wireless communication device 102, for example over a broadcast channel accessible to wireless communication device 102. In another embodiment, networks 106 may provide associated network capability information 108 upon request by wireless communication device 102. In this embodiment, wireless communication device 102 may request network capability information 108 directly from communication network 106, for example, over wireless link 104, or through, for example, a data site of the communication network accessible through a data network such as the internet.

Network capability information 108 may also include the types of services an associated communication network supports. Services may include serial data connections, an ISDN (Integrates Services Digital Network) service, a CCITI Group 3 and 4 facsimile service, an IEEE 802.11 or 802.x LAN service, an AppleTalk LAN service, as well as the various packet data radio services including GSM type services, analog cellular service, digital cellular service, satellite voice service, PCS, and CDMA and Wideband CDMA services. Any particular communication network may support communication of more than one information content class and may be configured to operate over various types of communication channels at different bit rates/bandwidths or error rates, and in accordance with different communication standard and techniques. It should be noted that communication networks 106 include local communication networks, such as a communication network within an office area or building, as well as communication networks spanning the globe and provided by satellites.

Figure 2:
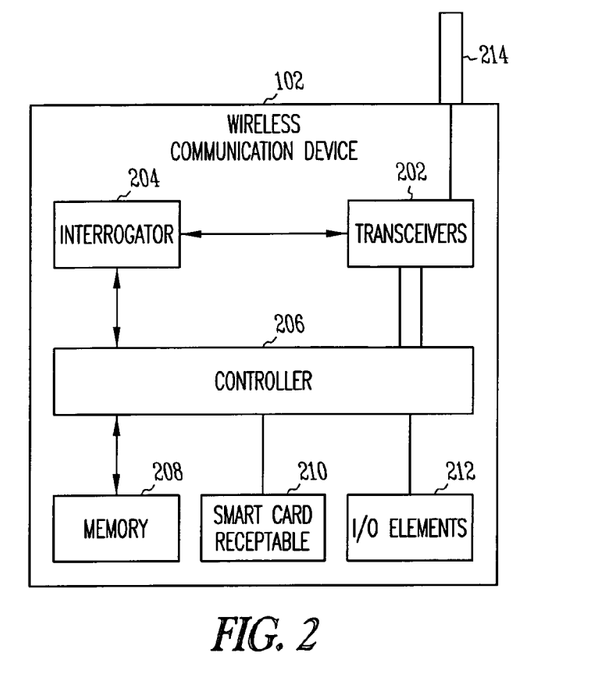
FIG. 2 illustrates a functional block diagram of a wireless communication device in accordance with an embodiment of the present invention.

FIG. 2 illustrates a functional block diagram of a wireless communication device in accordance with an embodiment of the present invention. Wireless communication device 102 comprises transceivers 202 coupled with interrogator 204 and controller 206. Wireless communication device 102 also comprises memory 208 and input output (I/O) elements 212 each coupled with controller 206. In one embodiment, wireless communication device 102 may comprise smart card receptacle 210 coupled to controller 206 to provide information from a smart card. Transceivers 202 may provide for communicating with communication networks 106 (FIG. 1) over wireless links 104 (FIG. 1) using antenna 214. In accordance with one embodiment, transceivers 202 comprise functionality for communicating with different communication networks 106 (FIG. 1) using a multitude of communication techniques and implementing various wireless communication protocols. Interrogator 204 may provide for determining network capabilities 108 (FIG. 1) of communication networks 106 (FIG. 1) and may comprise a processor and software to control transceivers 202 and to interface with controller 206. Memory 208 may store information for use by wireless communication device 102 including software to run on controller 206 to provide the communication functionality of wireless communication device 102. Controller 206 may comprise a plurality of processors to allow wireless communication device to be configured for communicating in accordance with several communication techniques supported by communication networks 106 (FIG. 1). Controller 206 may also provide wireless communication device 102 the functionality to communicate many information content types over communication networks 106 (FIG. 1).

In one embodiment of the present invention, smart card receptacle 210 is configured to receive a smart card or alternatively, a subscriber information module or card allowing for information stored on the card to be accessible by controller 206. I/O elements 212 provide the input and output functionality of wireless communication device 102 and include elements for receiving an input or providing an output. For example, I/O elements 212 may include a display, a keyboard or keypad, a scanner and/or facsimile inputs, a speaker and microphone, and an IR port. In one embodiment, I/O elements 212 comprise elements to provide a wireline interface with a data network.

Figure 3:
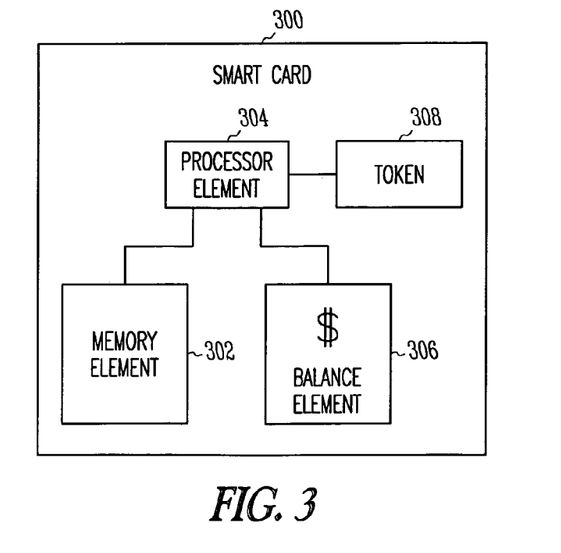
FIG. 3 illustrates a functional block diagram of a smart card suitable for use with an embodiment of the present invention.

FIG. 3 illustrates a functional block diagram of a smart card suitable for use with an embodiment of the present invention. Smart card 300 comprises memory element 302 for storing user information and balance element 306 for storing a user's available balance or credit availability information. The user available balance may be used for communication services provided by communication networks 106 (FIG. 1). Smart card 300 may also comprise processor element 304 and token 308. Processor element 304 controls the operations of smart card 300 and token 308 provides for security of information stored within smart card 300. Token 308 may include a security key, such as a user's private key and may be used, for example, to prevent tampering with user balance information in balance element 306. Token 308 may also be used for storing keys for secure communications. Although balance element 306 and memory element 302 are illustrated as separate elements to aid in the understanding of an embodiment of the present invention, it should be understood that balance element 306 and memory element 302 may be physically one or more memory devices. In one embodiment, user credit availability information may accessed through a service provider such as an Internet Service Provide (ISP).

In one embodiment of the present invention, user subscription information may be included as part of balance element 306. User subscription information comprises, for example, the amount of service a user may be allocated along with the amount of service used for that time period. For example, a user may prepay for a set amount of service per time period (e.g., 100 minutes of service per month or a predetermined amount of data per month). Wireless communication device 102 (FIG. 1) may track the type and quantity of service used to update a remaining service available in balance element 306. In an alternate embodiment of the present invention, user subscription information may be included in memory 208 (FIG. 2).

Figure 4:
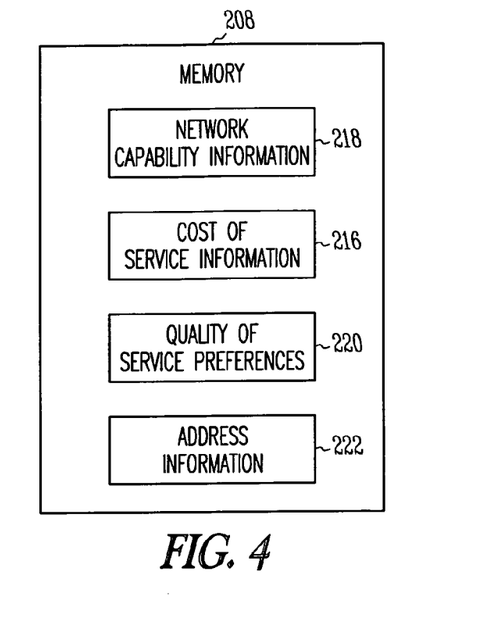
FIG. 4 illustrates a functional block diagram of portions of a memory of a wireless communication device in accordance with an embodiment of the present invention.

FIG. 4 illustrates a functional block diagram of portions of a memory of a wireless communication device in accordance with an embodiment of the present invention. Memory 208 may store network capability information 218, cost of service information 216, quality of service preferences 220 and address information 222. Network capability information 218 includes network capability information 108 (FIG. 1) received by wireless communication device 102 (FIG. 1) from communication networks 106 (FIG. 1). Cost of service information 216 includes cost information received by wireless communication device 102 (FIG. 1) from communication networks 106 (FIG. 1) as part of the network capability information 108 (FIG. 1). Quality of service preferences 220 are quality of service levels which may be set by a user for communicating various content types. These quality of service preferences may identify communication parameters which provide acceptable levels for communication of information content types for a particular user. In an alternate embodiment of the present invention, quality of service preferences 220 are stored in the user's smart card rather than in a memory of the wireless communication device.

In one embodiment of the present invention, address information 222 includes information about specific addresses for which a communication may be established.

Each address identified in address information 222 includes an address type which may include IP addresses, voice addresses, and Short Message System (SMS) addresses along with address connection status data. Address connection status data may include parameters depending on the address type. For example, address connection status data may include round trip delay, number of hops and delay information for IP addresses, minimum, maximum and average durations for voice addresses, and cost information. In accordance with this embodiment, address information is used to more accurately reflect the delay and hence the cost of communications over circuit switched network connections. Initially, default values may be used for address connection status data until enough actual data is generated. Actual data may indicate specific user trends useful for estimating communication session costs.

Figure 5:
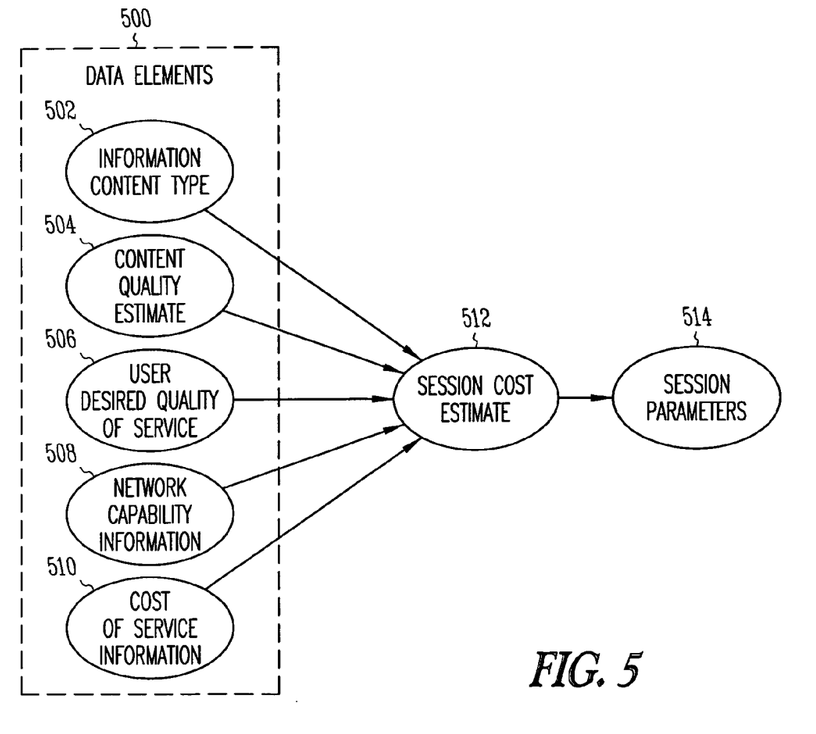
FIG. 5 illustrates an overview of communication session establishment in accordance with an embodiment of the present invention.

FIG. 5 illustrates an overview of communication session establishment in accordance with an embodiment of the present invention. In general, one or more data elements 500 may be used to determine a session cost estimate. Data elements 500 include information content type 502, content quantity estimate 504, user desired quality of service 506, network capability information 508 and cost of services 510. When a user accepts session cost estimate 512, session parameters 514 are used to establish a communication session between a wireless communication device such as wireless communication device 102 (FIG. 1) and a communication network such as one of communication networks 106 (FIG. 1).

Information content type 502 may comprise the content type of the information to be communicated in the communication session. Information content type 502 may include for example, voice conversation content, facsimile content, real-time audio or video content (including, for example, streamed or broadcasted audio or video), or data content. Data content may include data that will be downloaded or data files that are received (e.g., MPEG, text, graphics, MP3, etc). Data content may also include the information transfers that occur during sending or receiving email, and Web-browsing, for example. Information content types generally may be categorized into one of several information content classes. Examples of information content classes include, in the order of delay sensitivity, a real-time content class, a streaming content class, an interactive content class and a background content class. The conversational content class includes conversational/voice communications including real-time rich media communications and voice conversations. The streaming content class may be suitable for video and audio streaming. In the streaming content class, the time relation is generally preserved with relaxed delay requirements as compared to the real-time content class. The interactive content class is generally suitable for requesting and receiving information, for example, during Web browsing or email sessions. The background content class is generally suitable for communication sessions when the destination is not expecting information within a certain (short) time, for example, background email downloads or non-real-time data transfers.

Generally, different information content types which are categorized in the same content class have similar ranges of quality and service requirements (e.g., bandwidth, error rate, delay), however this may not always be the case. Some content types in the same class may have different ranges of quality of service requirements.

In one embodiment, content quantity estimate 504 is an amount of information that is anticipated to be communicated during a communication session. Content quantity estimate 504 may include a data quantity estimate in terms of the number of bits or number of data packets. Alternatively, content quantity estimate may include the anticipated time period for a communication session, for example, in the case of content in the real-time content class (e.g., voice conversations). Content quantity estimate 504 may include an estimate of a size of a data file stored in memory of the wireless communication device which is to be communicated, or may be based on previous amounts of information communicated by the user in prior communication sessions.

User desired quality of service 506 may define a quality of service desired by a user, and may be defined for a particular content type or content class. User desired quality of service 506 may include several levels of quality, and may be categorized into several quality of service levels. A first quality of service level may define the highest and/or best possible quality and a lower quality of service level may define a worst quality level that may be acceptable for the type of communication. A first quality of service level, for example may also be associated with the least delay or highest priority service while a lower quality of service level, on the other hand, may be associated with a greater delay or lower priority service. Quality of service levels generally have different meanings when applied to each content class or content type. In general, the quality of service level considers the quality as well as the amount of delay and priority of the communication session.

In some situations, quality of service may be defined primarily in terms of a bit error rate. In other situations, the quality of service may be defined primarily in terms of acceptable delay, while in other situations, the quality of service may be defined in both error rate and delay. For example, a significant delay may be acceptable but a very low bit error rate may be required for some communication sessions. For other communication sessions, a high bit error rate may be acceptable, but delays may not be. For real-time content class communications such as a voice conversation, the communication session may be acceptable to a user with some noise or static (e.g., a higher bit error rate or packet dropping rate), however an acceptable time-delay may only be up to a few seconds. For background class communications, on the other hand, significant delays may be acceptable, however a low bit error rate may also be desired by a user. In accordance with one embodiment of the present invention, user desired quality of service 506 may define quality of service levels for each content class. The number of quality of service levels envisioned by the present invention is three or four levels for each information content class, however this number may range between two and ten levels depending on the capabilities of the communication networks and the user's desires.

In one embodiment of the present invention, user desired quality of service 506 may include a security requirement or security level preference allowing the user to specify when security is desired for a communication session or for particular content. Security may include various levels and types of encryption, as well as authentication techniques such as digital signatures. User desired quality of service 506 may be stored in memory 208 (FIG. 2) of wireless communication device 102 (FIG. 2).

Network capability information 508 may define the capabilities of each communication network through which a wireless communication device may communicate. Network capability information 508 may comprise network capability information 108 (FIG. 1) received from communication networks 106 (FIG. 1). Network capability information 508 may be stored in memory 208 (FIG. 2) of wireless communication device 102 (FIG. 2) as network capability information 218 (FIG. 4).

Cost of service information 510 may define the cost of communicating for the levels of service and quality offered by a communication network. Cost of service information 510 may correspond with the cost information received as part of network capability information 108 (FIG. 1). Communication networks 106 (FIG. 1) may provide cost of service information 510 for each content class, and further define a cost of service for different service levels available within each content class. Communication networks 106 (FIG. 1) may also provide cost of service information 510 in terms of available bandwidth, bit-error-rate (BER) and priority levels given to packets. In general, cost of service information 510 is desirably defined in terms of a cost amount per quantity of data for the less time sensitive content classes, and in a cost per connection time for the time sensitive content classes such as the conversational content class. Cost of service information 510 may be provided directly by the networks to a wireless communication device in real-time, or may be stored in the wireless communication device's memory. Cost of service information 510 may be stored in memory 208 (FIG. 2) of wireless communication device 102 (FIG. 2) as cost of service information 216 (FIG. 4). In one embodiment of the present invention, cost of service information 510 may include additional costs imposed by a communication network such as taxes, tariffs, and use fees.

Session cost estimate 512 may be a cost estimate for the communication session desired by a user of a wireless communication device. Session cost estimate 512 may take into account any one or more of data elements 500. In the case of communication sessions that have their information content categorized in the conversational content class, it may be difficult to estimate the length or amount of data of a future conversational class communication session (e.g., voice conversations). Therefore, for content that falls into the conversational content class, the session cost estimate 512 may be provided in terms of cost per minute or per second or a cost per bit rather than a estimated total cost. Session cost estimate 512 may be provided for different available bandwidths and error rates supported by a communication network. Session cost estimate 512 is desirably displayed by I/O elements 212 (FIG. 2) of wireless communication device 102 (FIG. 2).

Session parameters 514 may define communication parameters for a communication session and may be defined for a particular content class (e.g., conversational class, streaming class, interactive class or background class). Session parameters 514 may include bandwidth, delay and error rate requirements, and packet priority. Session parameters 514 also may define the parameters of a communication channel through which a communication session may take place including frequencies, and protocol requirements.

In one embodiment of the present invention, session cost estimate 512 may base the cost of the communication session on information about specific addresses stored, for example, in a memory of the wireless communication device. For example, address information 222 (FIG. 4) may be used to estimate a cost of a communication session in a circuit switched communication network based on historical delay, number hops, and average duration of prior sessions. For example, when a specific phone number is dialed, address information for that address may be used to provide the user with of an expected cost range, and warn the user when the expected cost range exceeds the user's available balance. This is useful, for example, when a user's typical call to a number may last for ten minutes but the user may have only five minutes of prepaid time left or an available balance insufficient to cover a ten minute call.

Figure 6:
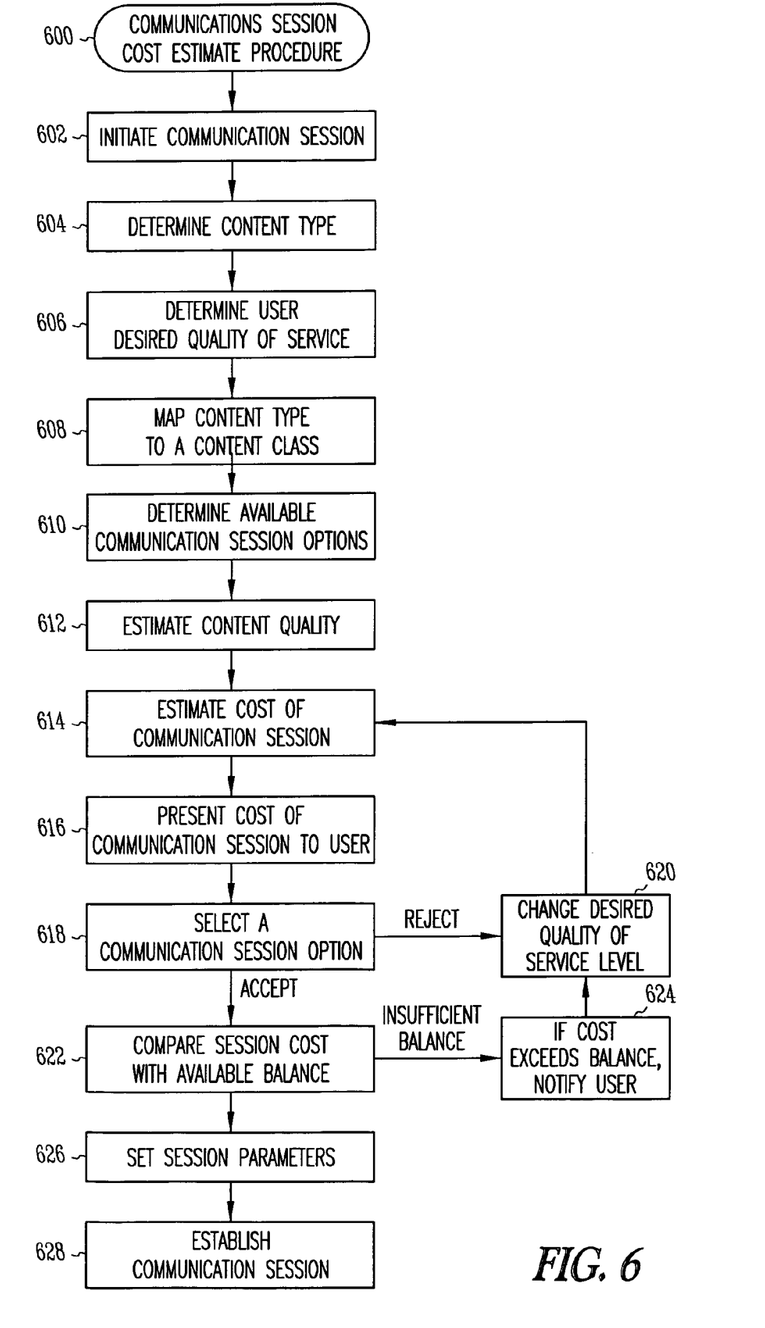
FIG. 6 is a flow chart of a communication session cost estimation procedure in accordance with an embodiment of the present invention.

FIG. 6 is a flow chart of a communication session cost estimation procedure in accordance with an embodiment of the present invention. Communication session cost estimation procedure 600 may be performed by wireless communication device 102 (FIG. 1) prior to initiating a communication session with one of communication networks 106 (FIG. 1). In operation 602, the wireless communication device initiates a communication session. A communication session may be initiated for each information content type a user desires to communicate. In accordance with one embodiment of the present invention, a wireless communication device may concurrently have more than one communication session established for each PDP address providing for the concurrent communication of different information content types. In other words, a wireless communication device may communicate several information content types at the same time, such as transmitting a fax while engaging in a voice conversation. Some examples of communication sessions that may be initiated by a wireless communication device include telephone voice communications, facsimile communications, one-way or two-way video conferencing, receiving or downloading data files (e.g., MPEG, text, graphics MP3), sending or receiving email, and Web browsing.

In operation 604, a content type, such as information content type 502 (FIG. 5), is identified for the content of the information that is to be communicated during the communication session. Generally, processors within the wireless communication device identify the content type with information supplied by a user through an I/O of the wireless communication device in conjunction with software operating on the wireless communication device. For example, Web browsing software may identify the information content type as a Web browsing session, email application software may identify the information content type as an email session, or other communication software may identify an initiated telephone call as conversational content.

In operation 606, the wireless communication device determines the user's desired quality of service, such as user desired quality of service 506 (FIG. 5) for the communication session. The user may be prompted for an input, or the user's desired quality of service may be retrieved from a memory of the wireless communication device that stores quality of service preferences for a particular user. In operation 608, the content type is mapped to an information content class, such as a real-time content class, a streaming content class, an interactive content class or a background content class, as discussed above.

In operation 610, the wireless communication device determines the communication session options that are available for a communication session. Operation 610 may include determining the capabilities, such as network capabilities 108 (FIG. 1) of one or more of the available communication networks. In general, a wireless communication device determines network capabilities for each information content class for each available communication network. In addition, operation 610 includes determining cost information, such as cost of service information (510) associated with the network capabilities. In one embodiment, the wireless communication device may interrogate available communication networks for network capability and cost information. For example, a network may provide this information to the wireless communication device upon request or via a broadcast channel. Alternatively, the wireless communication device may send out an interrogation signal to available communication networks requesting communication session options and associated cost of service information. In another embodiment, the wireless communication device may have network capability and cost information for available communication networks stored within its memory for use, for example, when this information is not available from the communication networks.

In operation 612, the wireless communication device estimates a content quantity amount which is an estimate of the amount of information that is anticipated to be communicated during the communication session. In operation 614, the cost of the communication session is estimated based on the content quantity estimate, the user desired quality of service level, and the cost of service information. In the case of real-time communications such as voice conversations, the cost of the communication session may be estimated in terms of cost per minute or per second, rather than an estimated total cost of the session.

In one embodiment of the present invention, operation 614 estimates the cost of the communication session using information about specific addresses stored in memory of the wireless communication device. For example, address information 222 (FIG. 4) may be used to estimate a cost of a communication session in a circuit switched communication network based on historical delay, number hops, or average duration of prior sessions.

In operation 616, the wireless communication device presents the estimated cost of the communication session to the user. When several communication session options are available, the wireless communication device may present these as session options to the user. In one embodiment, the wireless communication device displays cost of service for the communication session options along with the quality of service levels available for the session options. In another embodiment, the wireless communication device presents the estimated cost of the communication session to the user that corresponds with the user's desired quality of service level for the particular information content type.

In operation 618, the user may accept or reject the communication session option(s) presented in operation 616. The user may make his/her decision depending on the cost of the service and the quality of the service for the communication session options. If the user rejects the presented communication session options, the user may change the desired quality of service in operation 620, and the wireless communication device may repeat operations 614–618 and present other communication session options to the user. Although not illustrated in FIG. 6, if the user rejects the communication session options, the user may also choose to refrain from initiating the communication session. When the user accepts one of the communication session options, operation 622 is performed.

In operation 622, the estimated cost of the communication option selected in operation 618 is compared to the user's balance available for communication services. The user's balance may take the form of a credit limit available through communication with a network, may be a balance available on a smart card or may be any form or user credit availability information. The user's balance may also include user subscription information which may be stored on a user's smart card. If the estimated cost of the communication session exceeds the available balance, operation 624 is performed and the user may be denied initiating the communication session. In this case, the user may change the desired quality of service in operation 620 and may, for example, lower the desired quality of service to potentially reduce the cost of the communication session. After the user changes the desired quality of service level in operation 620, operations 614–618 are repeated allowing the user to choose other communication options. In another embodiment, when the estimated cost of the communication session exceeds a predetermined percentage of the user credit availability information, operation 624 is performed and the user may be denied initiating the communication session.

In one embodiment, operations 618 through 624 may be performed together allowing the user to select between communication session options for which a sufficient balance exists. Operations 622 and 624 are generally performed for wireless communication devices that have the ability to use user credit information. Examples include wireless communication devices that are fitted with smart card receptacles, subscriber information modules, or credit card readers. In another embodiment of the present invention in which a wireless communication device may not have the ability to use user credit information, such as when a user is billed for communication services, operations 622 and 624 may not be performed.

In operation 626, the wireless communication device sets parameters for a communication session based on the communication session option selected by the user in operation 618. In operation 628, the wireless communication device establishes a communication session with a communication network in accordance with session parameters established for that communication network.

In one embodiment of the present invention, a user is presented with cost of service information and quality of service information for a plurality of communication session options. A communication session is initiated in response to the user selecting one of the communication session options. In this embodiment, the wireless communication device may interrogate a plurality of available communication networks to determine the cost of service information and quality of service information for the plurality of communication session options.

In one embodiment of the present invention, a computer readable medium may have program instructions stored thereon for performing a method of initiating a communication session with a communication network when executed within a wireless communication device. The programming instructions may be embodied in a tangible medium such as a computer readable disk or a memory element. In accordance with this embodiment, the programming instructions may be a computer program and may configure the wireless communication device to initiate a communication session with a communication network. The programming instructions may, for example, configure a wireless communication device, such as wireless communication device 102 (FIG. 1) to implement one or more of the various operations of procedure 600.

Thus, a method and wireless communication device that provides users beforehand with the estimated cost of a communication session has been described. The method and wireless communication device allows a user of a wireless communication device to choose a level of quality for a communication session based on a cost estimate for the communication session. The method and wireless communication device may also allow a user to select a lower level of quality for a communication session when a cost estimate for the communication session is too high or exceeds an user's available balance. The method and wireless communication device may also provide a cost estimate for a communication session based on a quality of service level for the communication session. The method and wireless communication device may also provide an estimate of information content quantity prior to a communication session and provide a user with a cost estimate for the communication session based on the estimated content amount at the user's desired quality of service level. The method and wireless communication device may also allow a user to select between various quality of service levels for a communication session.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of initiating a communication session comprising:
   interrogating a plurality of communication networks by a wireless communication device to determine available quality of service levels and cost of service information;
   determining at the wireless communication device cost estimates of the communication session based on the available quality of service levels and a quantity of information to be communicated, the quality of service levels comprising data rate information, error rate information and packet priority information and is based on an information content class;
   presenting the cost estimates and quality of service levels for the communication networks to a user; and
   initiating the communication session by the wireless communication device with a selected one of the communication networks based on the associated cost estimate.

2. The method as claimed in claim 1 further comprising:
   receiving data from the communication network corresponding to the quality of service level desired by the user of the wireless communication device; and
   determining network capabilities by the wireless communication device from the communication network, the network capabilities comprising available quality of service levels and cost of service information, and
   wherein determining the cost estimate includes estimating a content amount to determine the quantity of information to be communicated, the cost estimates being based on the estimated content amount and cost of service information for an available quality of service level substantially corresponding with the data received by the user.

3. The method as claimed in claim 2 wherein determining network capabilities comprises interrogating the plurality of communication networks to determine the available quality of service levels and the cost of service information for each communication network of the plurality, and
   wherein the method further comprises selecting, by the user, one of the communication networks based on the available quality of service levels and cost of service information.

4. The method as claimed in claim 2 wherein determining network capabilities comprises retrieving available quality of service levels and cost of service information for the plurality of communication networks from a memory of the wireless communication device.

5. The method as claimed in claim 1 further comprising:
   comparing user credit availability information with the cost estimates for the communication session; and
   initiating the communication session when the cost estimate for the selected communication network is not greater than a predetermined percentage of the user credit availability information.

6. The method as claimed in claim 5 wherein the quality of service levels includes a first and a second quality of service level, and wherein the cost estimates include a first and a second cost estimate, the method further comprising:
   providing the first cost estimate of the communication session to a user of the wireless communication device;
   allowing the user to select the second quality of service level for the communication session when the first cost estimate is not accepted;
   providing the second cost estimate of the communication session to the user based on the second quality of service level and the quantity of information; and
   initiating the communication session when either the first or second cost estimate is accepted.

7. The method as claimed in claim 5 wherein comparing the user credit availability information comprises comparing user credit availability information stored in a smart card readable by the wireless communication device.

8. The method as claimed in claim 5 further comprising the step of:
   refraining from initiating the communication session when the cost estimate for the selected communication network exceeds the user credit availability information;
   notifying a user when the cost estimate for the selected communication network exceeds the user credit availability information; and
   allowing the user to select a different quality of service level for the communication session when the cost estimate for the selected communication network exceeds the user credit availability information.

9. The method as claimed in claim 8 further comprising selecting the content class from one of a plurality of information content classes from a group including a conversational content class, a streaming content class, an interactive content class and a background content class, and
   wherein the quality of service level is based on the selected information content class.

10. The method as claimed in claim 1 wherein the quality of service levels include a desired quality of service level for the user, the method further comprising:
    determining the desired quality of service level by prompting the user to select one of a plurality of quality of service levels;
    using the selected quality of service level to provide the cost estimates; and
    receiving an input from the user to either reject or accept one of the presented cost estimates.

11. The method as claimed in claim 1 wherein the quality of service levels include a desired quality of service level for the user, the method further comprising:
    determining the desired quality of service level by retrieving the desired quality of service level from a smart card coupled with the wireless communication device;

using the desired quality of service level to present the cost estimates; and
receiving an input from the user to either reject or accept one of the presented cost estimates.

12. The method as claimed in claim 1 wherein a packet radio service network that provides packet data services to wireless communication devices in accordance with a packet data protocol (PDP),
wherein one of the wireless communication devices is assigned a PDP address for communicating with the packet radio network during a plurality of communication sessions, wherein the quality of service levels include a first and a second quality of service level, the method further comprising:
communicating using a first PDP address during a first of the communication sessions at the first quality of service level; and
communicating using a second PDP address during a second of the communication sessions at the second quality of service level.

13. The method as claimed in claim 12 wherein a first content type is communicated during the first of the communication sessions at the first quality of service level, and a second content type is communicated during the second of the communication sessions at the second quality of service level.

14. The method as claimed in claim 12 wherein the first quality of service level has a first cost of service associated therewith, and the second quality of service level has a second cost of service associated therewith, and the method further comprises:
providing a first cost estimate to the user for the communication session to communicate a first content type based on the first cost of use and a quantity of information to be communicated; and
receiving an input from the user to either reject or accept the first cost estimate.

15. A method of providing cost of quality of service information to a user of a wireless communication device comprising:
interrogating, by the wireless communication device, a plurality of communication networks to determine available quality of service levels and cost of service information;
presenting cost estimates to the user for the available ciuality of service levels; and
allowing user to select one of the quality of service levels at the wireless communication device for the communication session from the available determined quality of service levels, the quality of service levels comprising data rate information, error rate information and packet priority information and is based on an information content class.

16. The method as claimed in claim 15 wherein the cost estimates include a first and a second cost estimate, the method further comprising:
determining the first cost estimate by the wireless communication device for the communication session based on the selected quality of service level and a quantity of information to be communicated during the communication session; and
allowing the user to select the second quality of service level when the first cost estimate is not accepted.

17. The method as claimed in claim 16 further comprising:
providing the second cost estimate of the communication session to the user based on the second quality of service level and the quantity of information; and
initiating the communication session when either the first or the second cost estimate is accepted.

18. A method of communicating in a packet radio service network wherein a wireless communication device has a packet data protocol (PDP) address for establishing a plurality of communication sessions with the packet radio service network, wherein the packet radio network provides communications at a first quality of service level during a first of the communication sessions, and communications at a second quality of service level during a second of the communication sessions, the quality of service level comprising data rate information, error rate information and packet priority information and is based on an information content class, the method comprising:
interrogating, by the wireless communication device, the packet radio service network to determine available quality of service levels and cost of service information;
a presenting, by the wireless communication device, a cost estimate to a user of the wireless communication device for the communication session to communicate during the first of the communication sessions based on a quantity of information; and
communicating during the first of the sessions at the first quality of service level when the cost estimate is accepted.

19. The method as claimed in claim 18 further comprising initiating a communication session with the packet radio service network when the cost estimate does not exceed an available user balance stored within a smart card readable by the wireless communication device.

20. The method as claimed in claim 18 wherein the cost estimate is a first cost estimate, the method further comprising:
providing a second cost estimate to the user for the communication session to communicate during the second of the communication sessions when the user rejects the first cost estimate; and
communicating during the second communication session at the second quality of service level when the user accepts the second cost estimate.

21. A wireless communication device comprising:
a processor to determine cost estimates of a communication session for various quality of service levels and based on a quantity of information to be communicated, the quality of service levels comprising data rate information, error rate information and packet priority information and based on an information content class;
a transceiver to interrogate a plurality of communication networks to determine available quality of service levels and cost of service information, and to initiate the communication session with a selected one of the networks when the cost estimate is accepted;
a display to present the cost estimates for the quality of service levels to the user for used by the user in selection of one of the networks; and an input element to accept a selection of one of the networks from the user based on the presented cost estimates.

22. The wireless communication device as claimed in claim 21 wherein the quality of service levels include a first and a second quality of service level, and wherein the cost estimates include a first and a second cost estimate, wherein the input element is to allow the user to select the second quality of service level for the communication session when the first cost estimate is not accepted, and wherein the display is to provide the second cost estimate of the communication session to the user based on the second quality of service level and the quantity of information, and
wherein the processor to cause the transceiver to initiate the communication session when the second cost estimate is accepted.

23. The wireless communication device as claimed in claim 21 wherein the network capabilities comprise available quality of service levels and cost of service information, and
the processor to estimate a content amount to determine the quantity of information to be communicated, and to determine the cost estimates based on the content amount and cost of service information for an available quality of service level corresponding with the quality of service level stored in the memory.

24. The wireless communication device as claimed in claim 21 wherein the transceiver comprises an interrogator to interrogate the plurality of communication networks to determine the available quality of service levels and cost of service information for each of the plurality of communication networks available to the wireless communication device.

25. The wireless communication device as claimed in claim 21 wherein the processor compares user credit availability information stored on a smart card readable by the wireless communication device with the cost estimates for the communication session, and causes the transceiver to initiate the communication session when the cost estimate for the selection network is not greater than the user credit availability information.

26. The wireless communication device as claimed in claim 21 wherein the processor compares user credit availability information with the cost estimate associated with the selected network for the communication session, causes the transceiver to initiate the communication session when the cost estimate associated with the selected network does not exceed a predetermined percentage of the user credit availability information, causes the transceiver to refrain from initiating the communication session when the cost estimate associated with the selected network exceeds the user credit availability information, notifies a user when the cost estimate associated with the selected network exceeds the user credit availability information, and allows the user to select a different quality of service level for the communication session when the cost estimate associated with the selected network exceeds the user credit availability information.

27. The wireless communication device as claimed in claim 21 wherein a wireless communication device is assigned a packet data protocol (PDP) address for communicating during a plurality of communication sessions with the packet radio network, the quality of service level is a first quality of service level, and wherein the packet radio network provides communications at the first quality of service level during a first of the communication sessions, and communications at a second quality of service level during a second of the communication sessions,
wherein the transceiver communicates at the first quality of service level during the first of the communication sessions, and communicates at the second quality of service level during the second of the communication sessions.

28. The wireless communication device as claimed in claim 27 wherein the first quality of service level has a first cost of use associated therewith, and the second quality of service level has a second cost of use associated therewith, and wherein the processor provides the cost estimate for the first of the communication sessions to communicate a first content type based on the first cost of use and a quantity of information of the first content type.

29. A computer readable medium having program instructions stored thereon for initiating a communication session with a communication network when executed within a wireless communication device, the instructions to cause the wireless communication device to:
interrogate a plurality of communication networks to determine available quality of service levels and cost of service information;
determine cost estimates of the communication session based on available quality of service levels and a quantity of information to be communicated, the quality of service levels comprising data rate information, error rate information and packet priority information and is based on an information content class;
present the cost estimates and quality of service levels for the communication networks to a user; and
initiate the communication session when the cost estimate is accepted.

30. The computer readable medium as claimed in claim 29 wherein the quality of service levels include a first and a second quality of service level, and wherein the cost estimates include a first and a second cost estimate, and wherein the program instructions configure the wireless communication device to:
provide the first cost estimate of the communication session to the user of the wireless communication device;
allow the user to select the second quality of service level for the communication session when the first cost estimate is not accepted;
provide the second cost estimate of the communication session to the user based on the second quality of service level and the quantity of information; and
initiate the communication session when either the first or second cost estimate is accepted.

31. The computer readable medium as claimed in claim 29 wherein the programming instructions configure the wireless communication device to:
receive data corresponding to the quality of service level desired by a user; and
determine network capabilities from the communication network, the network capabilities comprising the available quality of service levels and cost of service information,
and wherein determining the cost estimate includes estimating a content amount to determine the quantity of information to be communicated, the cost estimate being based on the estimated content amount and cost of service information for an available quality of service level substantially corresponding with the data received by the user.

32. The computer readable medium as claimed in claim 29 wherein the programming instructions configure the wireless communication device to:
compare user credit availability information with the cost estimate for the selected communication network for the communication session; and
initiate the communication session when the cost estimate is not greater than a predetermined percentage of the user credit availability information.

* * * * *

UNITED STATES PATENT AND TRADEMARK OFFICE
CERTIFICATE OF CORRECTION

PATENT NO. : 7,058,387 B2  Page 1 of 1
APPLICATION NO. : 10/000051
DATED : June 6, 2006
INVENTOR(S) : Kumar et al.

It is certified that error appears in the above-identified patent and that said Letters Patent is hereby corrected as shown below:

In column 15, line 46, in Claim 15, delete "ciuality" and insert -- quality --, therefor.

In column 15, line 47, in Claim 15, after "allowing" insert -- the --.

In column 16, line 20, in Claim 18, before "presenting," delete "a".

Signed and Sealed this

Fourteenth Day of November, 2006

JON W. DUDAS
*Director of the United States Patent and Trademark Office*